(12) United States Patent
Yu et al.

(10) Patent No.: US 11,451,635 B2
(45) Date of Patent: Sep. 20, 2022

(54) SECURE SESSION RESUME

(71) Applicant: Citrix Systems, Inc., Fort Lauderdale, FL (US)

(72) Inventors: Yedong Yu, Nanjing (CN); Shutian Yao, Shanghai (CN); Yajun Yao, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/170,136

(22) Filed: Feb. 8, 2021

(65) Prior Publication Data
US 2022/0210230 A1    Jun. 30, 2022

Related U.S. Application Data

(63) Continuation of application No. PCT/CN2020/141260, filed on Dec. 30, 2020.

(51) Int. Cl.
| | |
|---|---|
| *G06F 15/16* | (2006.01) |
| *H04L 67/141* | (2022.01) |
| *H04L 67/145* | (2022.01) |
| *G06F 21/84* | (2013.01) |
| *G06F 9/451* | (2018.01) |

(Continued)

(52) U.S. Cl.
CPC .......... *H04L 67/141* (2013.01); *G06F 9/452* (2018.02); *G06F 21/84* (2013.01); *H04L 67/01* (2022.05); *H04L 67/02* (2013.01); *H04L 67/145* (2013.01)

(58) Field of Classification Search
CPC ..... H04L 67/141; H04L 67/02; H04L 67/145; H04L 67/42; G06F 9/452; G06F 21/84
See application file for complete search history.

(56) References Cited

U.S. PATENT DOCUMENTS

| 9,723,000 B1* | 8/2017 | Daniel ............. H04L 63/0876 |
| 10,715,997 B2* | 7/2020 | Yu .................... H04W 12/08 |

(Continued)

FOREIGN PATENT DOCUMENTS

| CN | 103064585 A | 4/2013 |
| CN | 104704448 A | 6/2015 |

(Continued)

OTHER PUBLICATIONS

International Search Report and Written Opinion for App. No. PCT/CN2020/141260, dated Sep. 28, 2021, 9 pages.

*Primary Examiner* — Cheikh T Ndiaye
(74) *Attorney, Agent, or Firm* — Daly, Crowley, Mofford & Durkee, LLP

(57) ABSTRACT

Techniques are disclosed for providing secure resume of sessions such as, for example, application sessions. An example methodology implementing the techniques includes receiving, by a computing device, a request to resume a session, the session being hosted on a remote computer system and accessible by the computing device to enable display of content of the session via the computing device. The method also includes initiating one or more actions on the remote computer system to prevent content of the session from being visible on the computing device in response to resumption of the session and resuming the session on the remote computer system such that the content of the session is hidden from view within a display of the computing device as a result of the initiation of the one or more actions.

19 Claims, 13 Drawing Sheets

| Type of Session | Resume Method | Action(s) |
|---|---|---|
| mobile unlock | unlock hotkey + power button | minimize all running applications and display home screen |
| PC unlock | shift key + enter | minimize all running applications and display home screen |
| remote desktop | secure resume flag set in remote desktop session launch command | minimize all running applications and display desktop window |
| remote application | secure resume flag set in remote application session launch command | kill existing running remote application and relaunch the remote application |
| SaaS application | secure resume flag set in application session launch command | start application with the initial page by reloading initial URL |
| ⋮ | ⋮ | ⋮ |

(51) Int. Cl.
*H04L 67/02* (2022.01)
*H04L 67/01* (2022.01)

(56) References Cited

U.S. PATENT DOCUMENTS

| | | | | |
|---|---|---|---|---|
| 2011/0179366 A1* | 7/2011 | Chae | .................. | G06F 21/84 |
| | | | | 715/764 |
| 2016/0302071 A1* | 10/2016 | Jones | .................. | H04W 12/08 |
| 2018/0336325 A1* | 11/2018 | Chinn | .................. | G06F 21/84 |
| 2019/0132381 A1* | 5/2019 | Momchilov | ............. | G09G 5/14 |
| 2020/0145385 A1* | 5/2020 | Chauhan | ............. | H04L 63/0884 |

FOREIGN PATENT DOCUMENTS

| | | | |
|---|---|---|---|
| CN | 104978109 A | 10/2015 |
| CN | 108431778 A | 8/2018 |
| WO | 2019173015 A1 | 9/2019 |
| WO | 2020005793 A1 | 1/2020 |

* cited by examiner

| Type of Session ⟋604 | Resume Method ⟋606 | Action(s) ⟋608 |
|---|---|---|
| mobile unlock | unlock hotkey + power button | minimize all running applications and display home screen |
| PC unlock | shift key + enter | minimize all running applications and display home screen |
| remote desktop | secure resume flag set in remote desktop session launch command | minimize all running applications and display desktop window |
| remote application | secure resume flag set in remote application session launch command | kill existing running remote application and relaunch the remote application |
| SaaS application | secure resume flag set in application session launch command | start application with the initial page by reloading initial URL |
| ... | ... | ... |

FIG. 6

SECURE SESSION RESUME

CROSS REFERENCE TO RELATED APPLICATION

This application is a continuation of and claims the benefit of PCT Patent Application No. PCT/CN2020/141260 filed on Dec. 30, 2020 in the English language in the State Intellectual Property Office and designating the United States, the contents of which are hereby incorporated herein by reference in its entirety.

BACKGROUND

As workforces become more mobile and work under various conditions, an organization may provide remote access tools, such as remote desktop software, for its employees, contractors, agents, partners, or other persons associated with the organization access network resources such as web applications. Remote desktop software enables users to connect to and interact with a computer in another location via an internal network or the internet. For example, an organization may provide content and resources in a cloud/network infrastructure and enable access to such content and resources using one or more Software-as-a-Service (SaaS) or remote desktop applications.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include receiving, by a computing device, a request to resume a session, the session being hosted on a remote computer system and accessible by the computing device to enable display of content of the session via the computing device. The method may also include initiating one or more actions on the remote computer system to prevent content of the session from being visible on the computing device in response to resumption of the session and resuming the session on the remote computer system such that the content of the session is hidden from view within a display of the computing device as a result of the initiation of the one or more actions.

According to another illustrative embodiment provided to illustrate the broader concepts described herein, a method may include detecting, by a computing device, an input to unlock the computing device and determining one or more actions to prevent a display of data on the computing device in response to the input to unlock of the computing device. The method may also include initiating the one or more determined actions on the computing device to prevent display of the data on the computing device in response to unlock of the computing device and presenting a user interface on a display of the computing device without display of the data within the display and in response to the initiation of the one or more determined actions.

According to another illustrative embodiment provided to illustrate the broader concepts described herein, a system includes a memory and one or more processors in communication with the memory. The processor may be configured to detect an input to unlock the computing device and determine one or more actions to prevent a display of data on the computing device in response to the input to unlock of the computing device. The processor may be further configured to initiate the one or more determined actions on the computing device to prevent display of the data on the computing device in response to unlock of the computing device and present a user interface on a display of the computing device without display of the data within the display and in response to the initiation of the one or more determined actions.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 shows an example secure resume policy, in accordance with an embodiment of the present disclosure.

DETAILED DESCRIPTION

Figure 1:
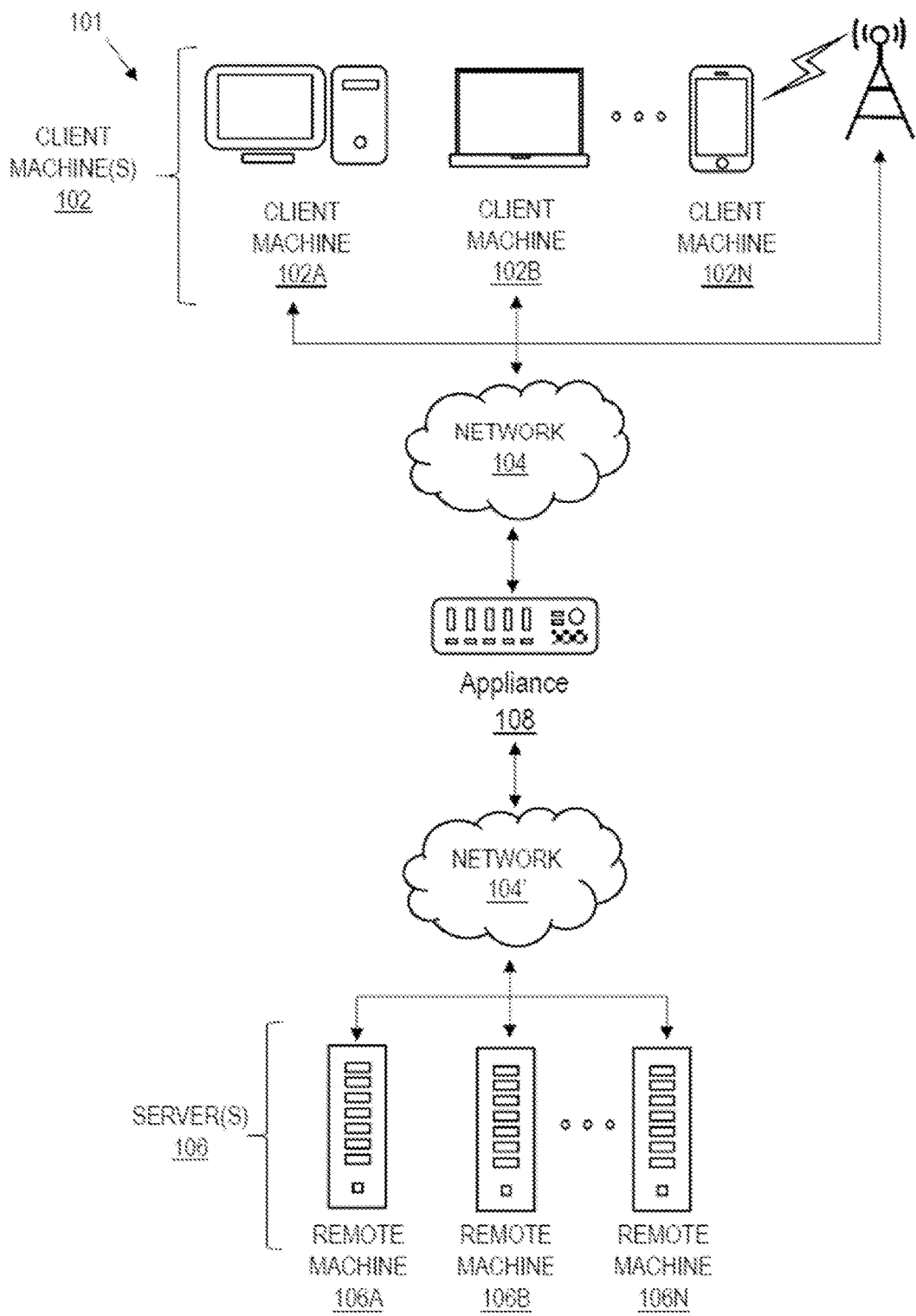
FIG. 1 is a diagram of an illustrative network computing environment in which embodiments of the present disclosure may be implemented.

Remote desktop software allows users to seamlessly connect to and interact with network applications via application sessions (also referred to as computing sessions). An application session typically begins when a user starts an application and ends when the application exits. After an application session begins, the application session may become disconnected for various reasons. For instance, the user may power down (or power off) the user's computing device or disconnect the session, for example, to relocate from one location to another location. Although the user's computing device is no longer communicating with the application once the application session is disconnected, the disconnected session is still active, and the application continues to run. Since the session remains active, the user can subsequently resume that application session and continue interacting with the application at a point at which the user left the application. However, returning the user to the application at the point at which the user left it may pose a security risk.

For example, a user may be using a computing device to connect to a remote application to view content, which may include sensitive information, on a display of the computing device. Without closing the remote application, the user may disconnect the application session. Subsequently, at a public location, the user may resume (e.g., launch) the application session, which causes the remote application to display the content that was being viewed by the user at the time the user disconnected the session. However, when the application session content is displayed, there is a risk that such displayed content may be leaked or otherwise compromised. For example, unauthorized persons nearby the display may be able to view the content, including any sensitive information, being displayed on the computing device.

As another example, a user may use a mobile device, such as a smart phone or laptop computer, to connect to a remote banking application to view financial information on a screen of the mobile device. Without closing the remote banking application, the user may lock or power off the mobile device. Subsequently, at a public location, the user may unlock or power on the mobile device causing the financial information from the remote banking application to be displayed on the mobile device's display. The financial information displayed on the mobile device is at risk of being leaked or otherwise compromised since unauthorized persons nearby the display may be able to view the displayed financial information.

Concepts, devices, systems, and techniques are disclosed for providing secure resume of sessions such as, for example, application sessions. A secure resume of a session is achieved by suppressing or otherwise preventing session content from being visible, for example, on a display of a computing device, when the session is being resumed (i.e., launched). Such prevention of the visibility of session content reduces (and ideally eliminates) the potential for leakage or loss of the session content during the resume of the session.

According to some embodiments disclosed herein, the secure resume of sessions can be governed based on one or more rules that define actions and the conditions under which the defined actions are to be performed. The actions defined in the rules control the display of session content in conjunction with the resume of a session such that the session content is prevented from being visible when the session is launched. For example, in an embodiment, a rule may indicate a type of session, a resume method, and an action or actions that are to be performed when the rule criteria or conditions (i.e., the indicated type of session and resume method) are satisfied (i.e., matched). The type of session indicates the type of session for which secure resume is permitted (i.e., supported), such as, for example, a remote desktop session, a remote application session, and a SaaS application session, to provide a few examples. The resume method indicates how to launch a secure resume of a session of the type indicated in the corresponding type of session. For example, a resume method may specify that a flag or other suitable indicator is to be included (or set) in a session launch command (e.g., a flag included in a connection description file for establishing a session). The action indicates the processing that is to be performed so as to provide a secure resume of the requested session. For example, a secure resume of a session can be provided by preventing session content from being visible when the session is launched. Examples of actions include, but are not limited to, minimizing a running application or applications, displaying a default desktop window or user interface (UI), terminating (or killing) a running application, closing a running application, relaunching a running application, loading an initial page for a running application, and suitable combinations thereof.

For example, and according to an embodiment, a resource management service, such as a digital workspace, can provide a secure resume feature that allows clients to securely resume disconnected sessions to resources hosted or otherwise provided by the resource management service. In such embodiments, the resource management service can maintain one or more rules to govern the secure resume of disconnected sessions. These rules may be referred to as a secure resume policy. In some examples, an authorized user, such as an administrator, can establish the rules for the secure resume policy. A client application used by a user to access the resource management service can provide a control, such as a check box, on the client application window or UI which can be selected (clicked) to enable the secure resume feature provided by the resource management service. For example, the user can click or otherwise select the provided control to enable or disable the secure resume feature. When the secure resume feature is enabled, a user input to reconnect a disconnected session (e.g., remote desktop session, remote application session, SaaS application session, among others) is processed as a request to reconnect and securely resume the disconnected session. Subsequently, in response to a user input to reconnect a disconnected session, the client application can determine from the control setting whether the user is requesting a secure resume or a "normal" (i.e., regular) resume of the disconnected session. Based on this determination, the client application can send to the resource management service a secure resume request (i.e., a request for a secure resume of the disconnected session) or a normal resume request (i.e., a request for a regular resume of the disconnected session).

In some implementations, the resource management service may utilize a broker, such as a resource management service connection broker, that manages the connections to resources, such as applications, SaaS applications, desktops, web sites, databases, and other types of network or connection-based resources, provided by the resource management service. To this end, the broker may keep track of which users are logged on, which resources individual users or groups of users are allowed to access, and which agents are hosting which resources to which users, for example. In such implementations, in response to a secure resume request from a client, the broker can identify an appropriate agent to host the resumed session, and check the secure resume policy to determine whether the policy includes a rule (i.e., a matching rule) that permits a secure resume of the requested session. If such a rule exists, the broker can generate a session launch command in accordance with the resume method specified in the rule. The broker can then send or otherwise provide to the client the generated session launch command for use by the client to launch a secure resume of the session with the identified agent. Otherwise, if the policy does not include a rule that permits a secure resume of the requested session, the broker can generate a command for use by the client to launch a normal resume of the session with the identified agent, and the client can use the generated command to launch a normal resume of the session with the identified agent. It will be appreciated that in implementations where a broker or other connection management service is not utilized, the processing performed by the broker described above and elsewhere in this disclosure may be performed by the resource management service or another component or components of the resource management service.

In some embodiments, the resource management service may provide the secure resume feature to allow users to securely unlock computing devices, such as, for example, mobile devices and personal computers (PCs). In such embodiments, the secure unlocking of computing devices may be governed by one or more rules contained in the secure resume policy. For example, a rule may specify how to securely unlock a computing device (e.g., depress, activate, or otherwise input a power button, unlock key sequence, a hotkey combination, one or more keys on a keyboard, or combinations thereof) and the processing that is to be performed to so as to provide a secure unlock of the computing device (e.g., minimize all running applications and display home screen). In the case where the computing device is managed by a managed mobility services (MMS) system, the resource management service can obtain the identity of the managed computing device from the MMS system, and can provision or otherwise provide the secure resume policy to the managed computing device. In some cases, the resource management service can provision or otherwise provide the secure resume policy to the MMS system for sending to the managed computing device(s). In the case where the computing device is a personal computing device (e.g., such as a computing device that is not managed by or enrolled with a management service), the user of the computing device can download or otherwise obtain the secure resume policy, for example, from a cloud service. In any case, when the computing device is unlocked, one or more actions may be initiated on the computing service based on the rules to cause the secure unlock of the computing device. These and other advantages, variations, and embodiments will be apparent in light of this disclosure.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices.

For short range communications within a wireless local-area network (WLAN), the protocols may include 802.11, Bluetooth, and Near Field Communication (NFC).

Figure 2:
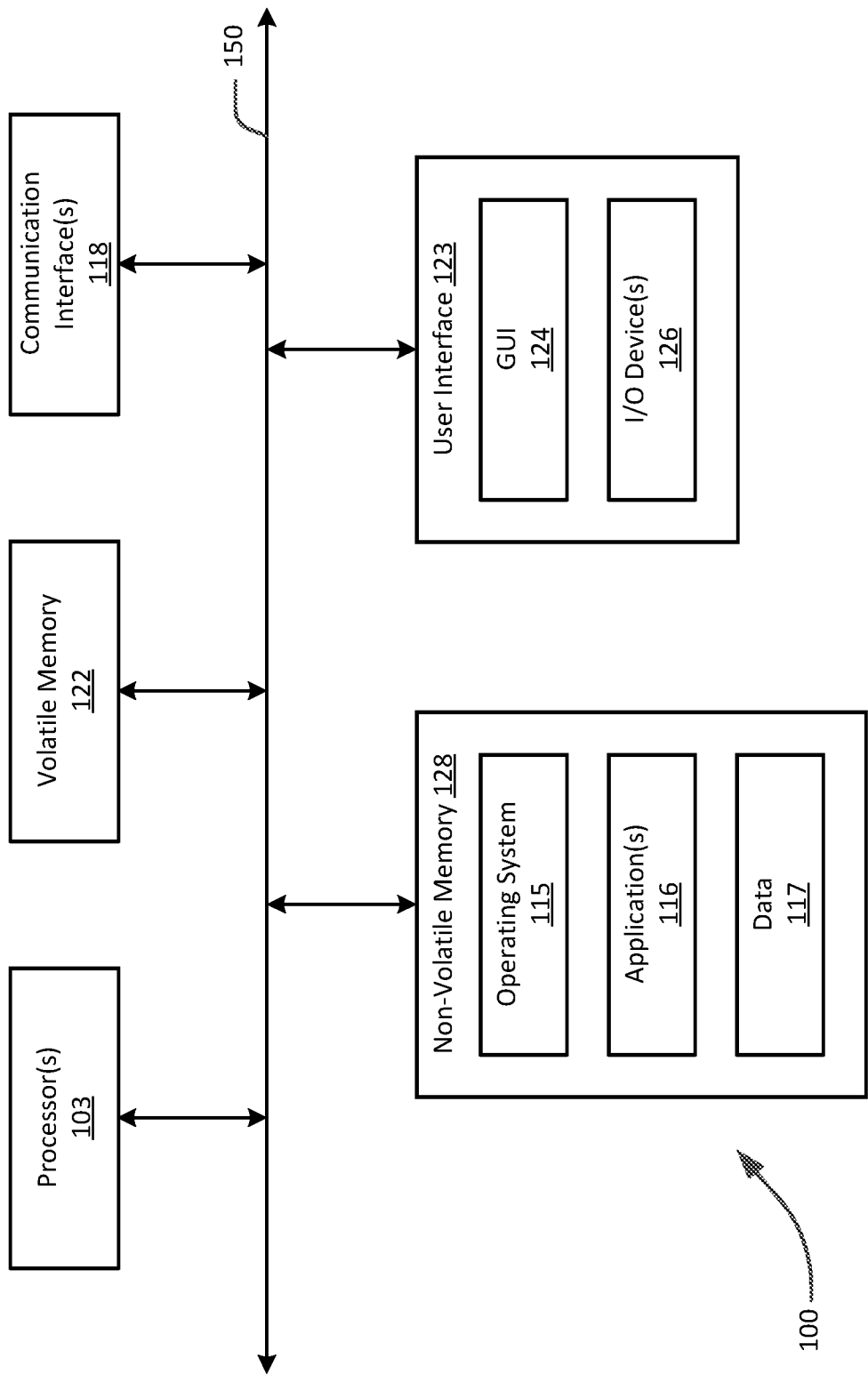
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
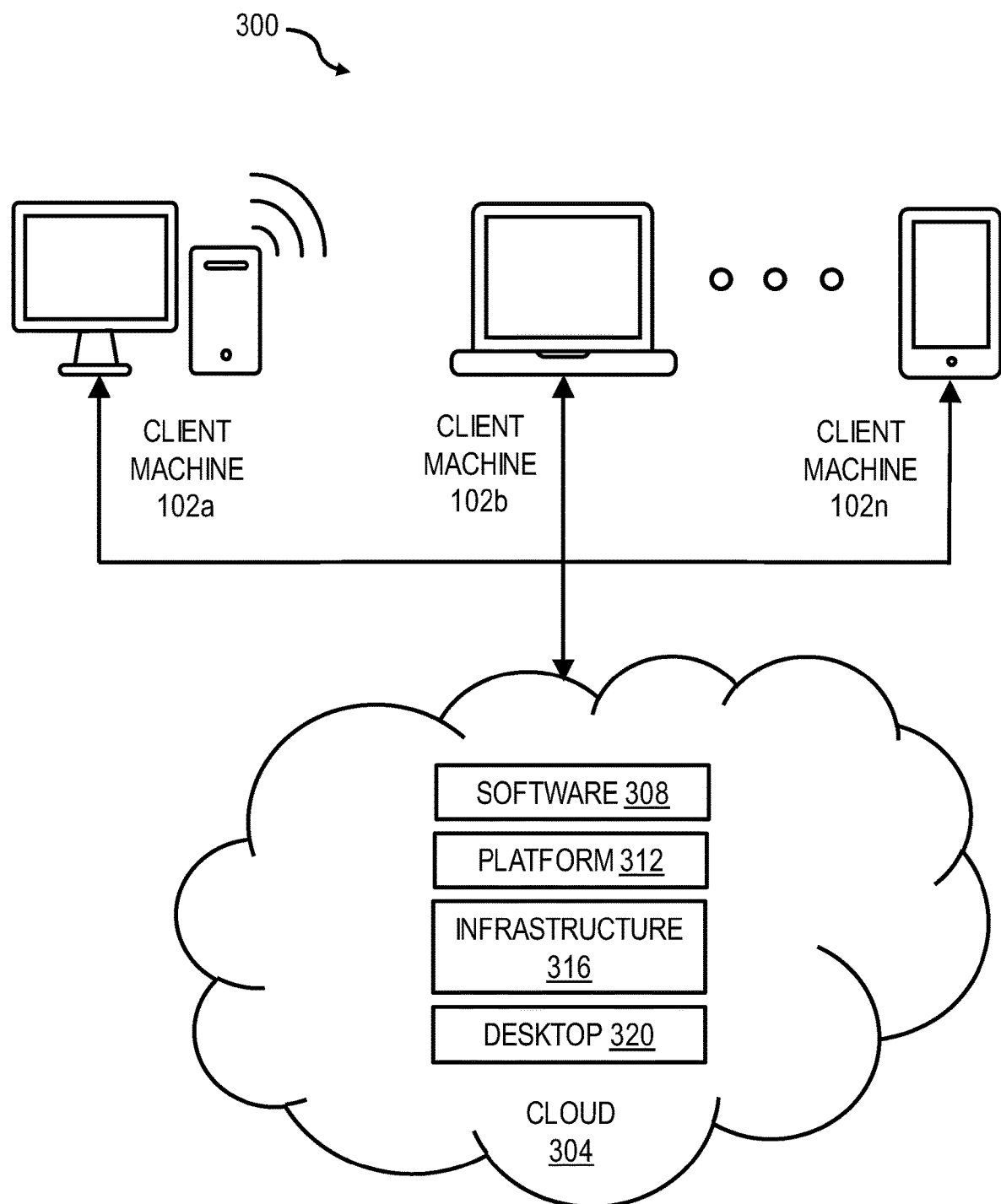
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
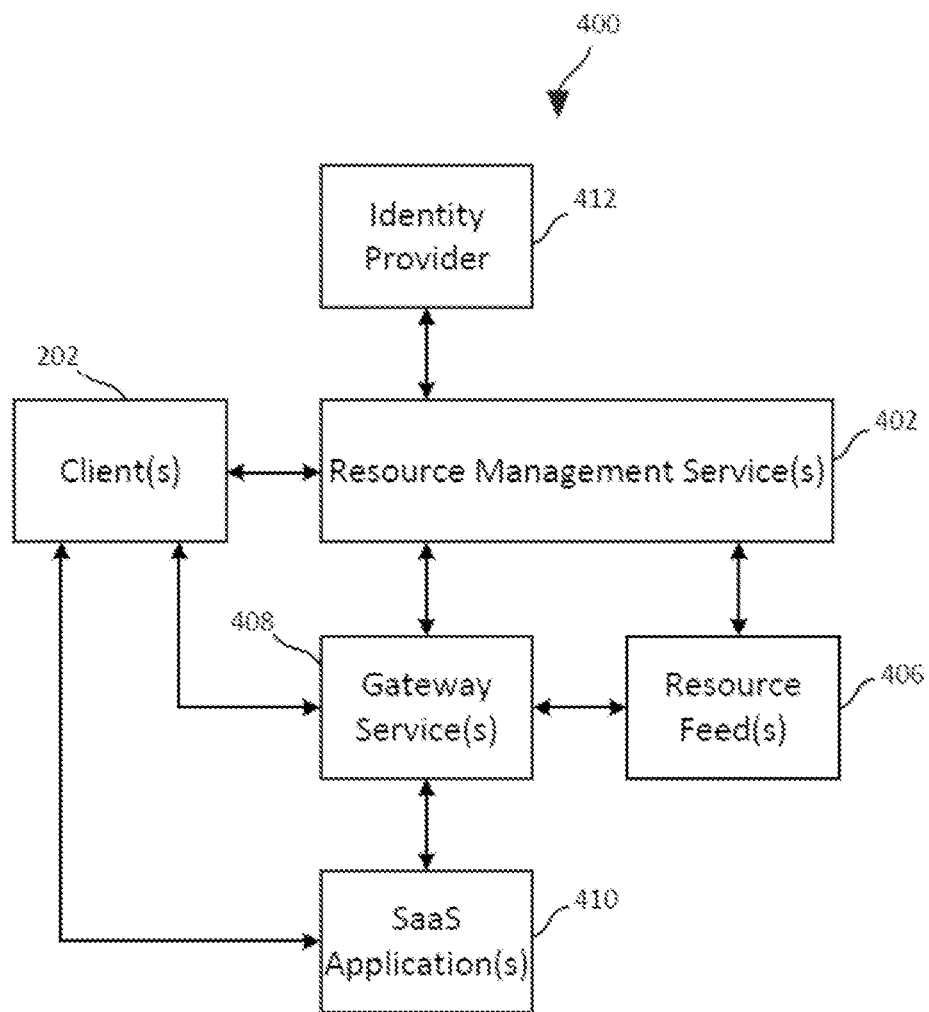
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
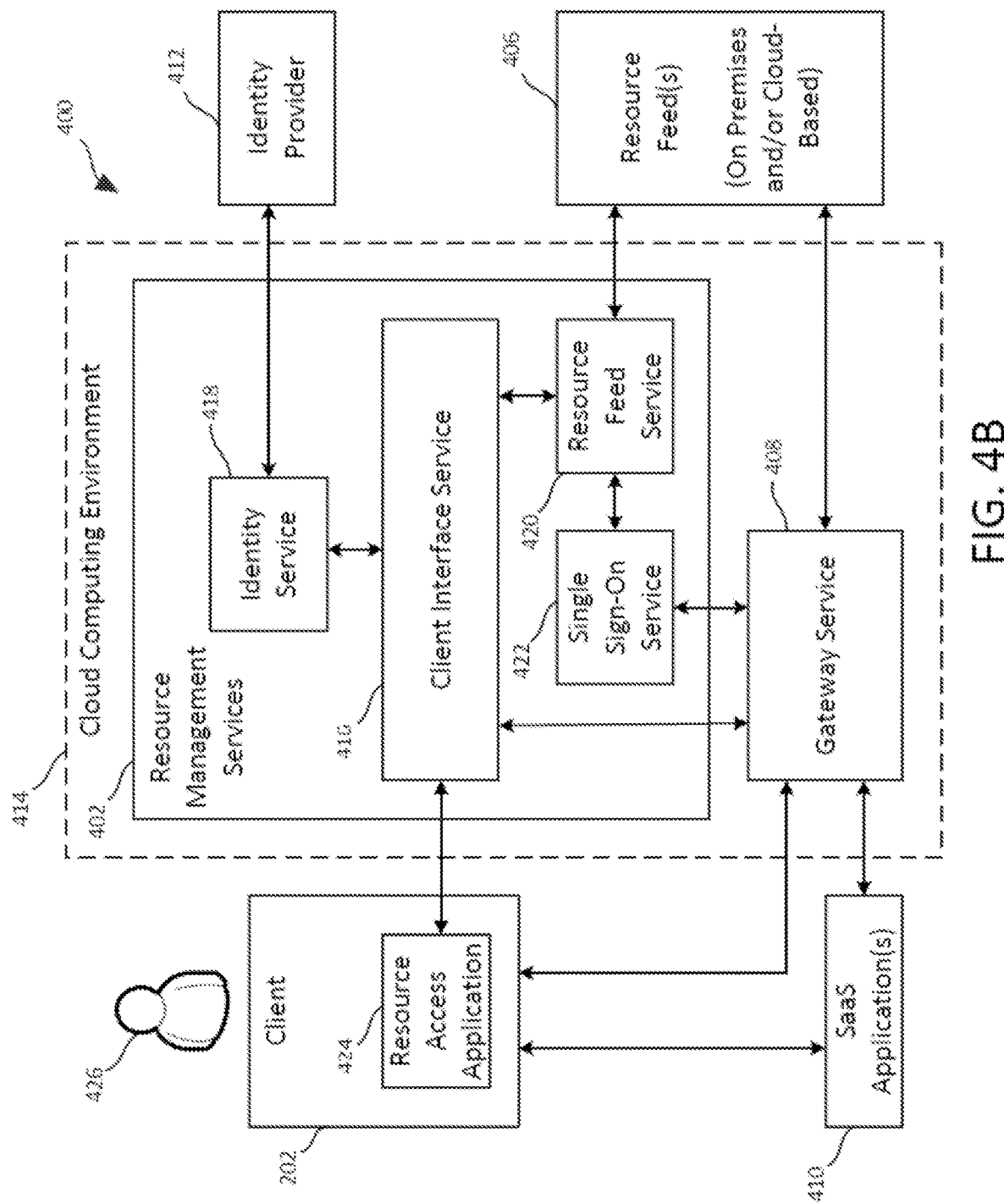
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
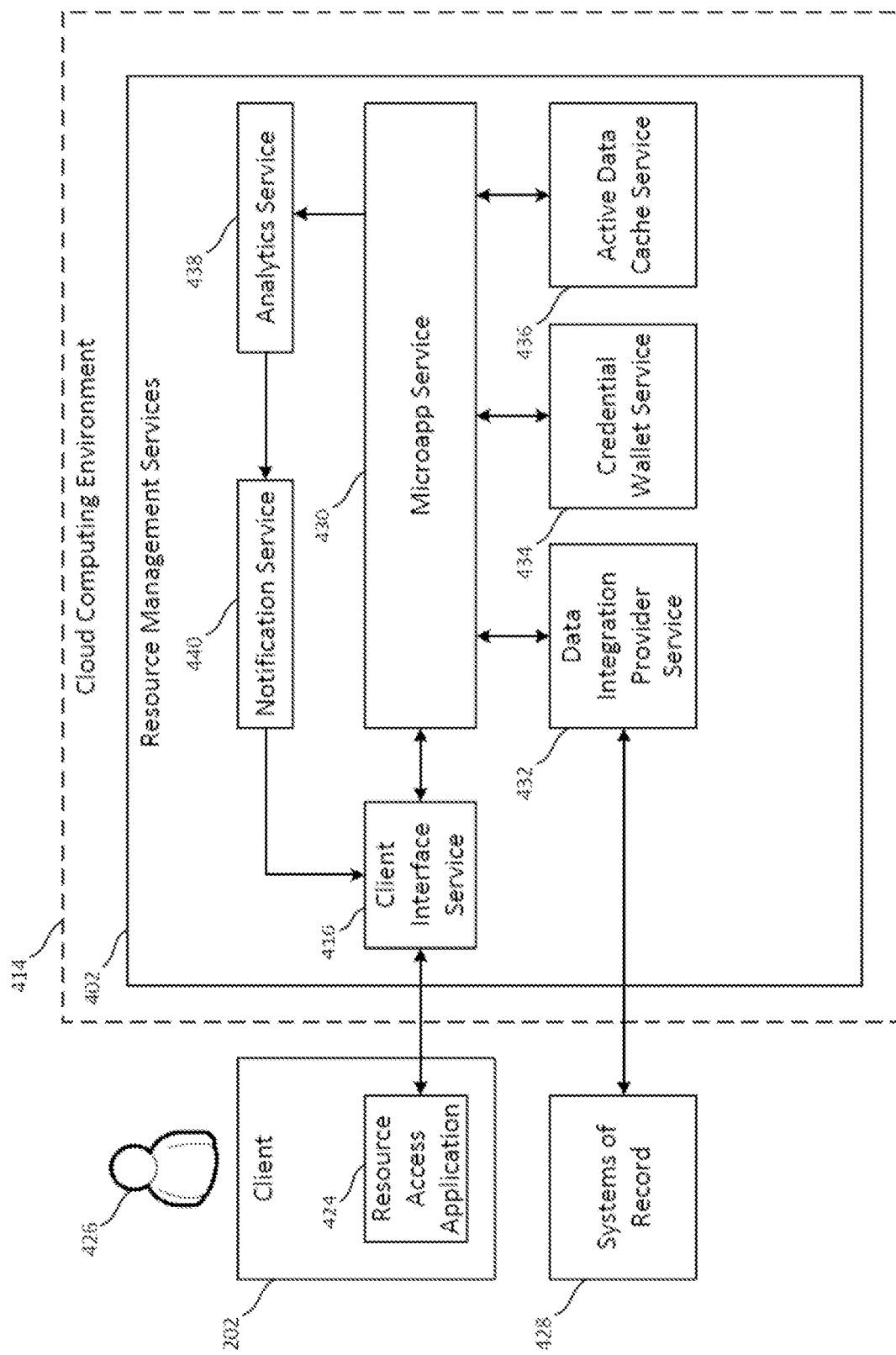
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
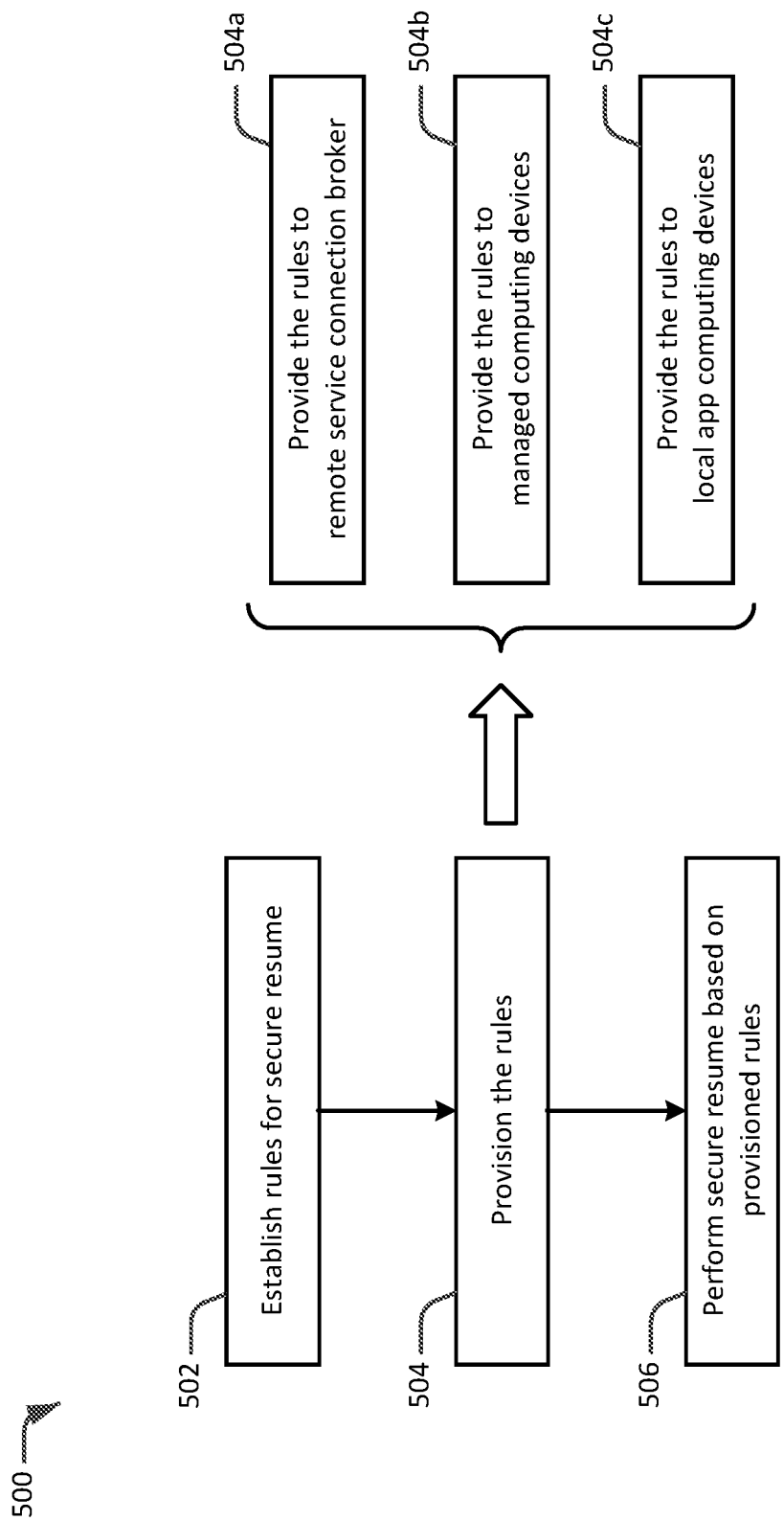
FIG. 5 shows an example secure resume deployment workflow, in accordance with an embodiment of the present disclosure.

FIG. 5 shows an example secure resume deployment workflow 500, in accordance with an embodiment of the present disclosure. In an embodiment, workflow 500 may be performed by a resource management service, such as resource management services 402 of FIGS. 4A-4C, to generate and provision the rules for governing the secure resume of sessions hosted or otherwise provided by the resource management service. For example, the sessions may be established to access resources such as applications, SaaS applications, desktops, web sites, databases, and other types of network and connection-based resources provided by the resource management service. With reference to workflow 500, one or more rules to govern the secure resume of the sessions is established (502). For example, an authorized user, such as an administrator, can establish one or more such rules. In an implementation, the established rules may be maintained in a secure resume policy. Examples of such rules are described below at least in the context of FIG. 6.

The resource management service can provision (504) the established rules (e.g., the secure resume policy) to appropriate devices and endpoints. For example, in cases where a broker, such as a resource management service connection broker or other connection broker, is being utilized to manage connections to services provided by the resource management service, the resource management service can provide (504a) the rules to the broker. The broker can then propagate the rules to the agents, such as, for example, virtual delivery agents (VDAs) and remote connection agents, that are being managed by the broker. Such a broker is further described below in connection with FIG. 7. As another example, in cases where one or more rules govern the secure unlocking of computing devices that are managed by or enrolled with a management service, such as a MMS system, the resource management service can obtain the identities of the enrolled computing devices from the management service. The resource management service can then provide (504b) the rules to the enrolled computing devices.

In some cases, the resource management service can provide the rules to the management service, and the management service can then propagate the rules to its managed (e.g., enrolled) computing devices. For computing devices not managed by or enrolled with a management service, such as personal computing devices, the resource management service can provide (504c) the rules to these personal computing devices. For example, the personal computing device may be a computing device used by a user to run local applications and the user may have requested the resource management service to provide the rules. In any case, once the rules (e.g., the secure resume policy) are provisioned, the secure resume of sessions (such as, sessions provided by the resource management service or secure unlocking of computing devices) can be performed (506) based on the provisioned rules.

FIG. 6 shows an example secure resume policy 600, in accordance with an embodiment of the present disclosure. Secure resume policy 600 contains one or more rules that define actions and the criteria for performing the defined actions. As described previously, secure resume policy 600 may be provisioned by a resource management service, such as resource management services 402 of FIGS. 4A-4C. Individual rules in secure resume policy 600 may indicate a type of session for which secure resume is permitted, how to launch a secure resume of a session of the indicated type, and an action or actions that are to be performed so as to provide a secure resume of the launched session.

As shown in FIG. 6, secure resume policy 600 includes rules 602a-602e (also individually referred to herein as rule 602 or collectively referred to herein as rules 602). Individual rules 602 include a type of session field 604, a resume method field 606, and an actions field 608. The number of rules 602 depicted in secure resume policy 600 is for illustration, and those skilled in the art will appreciate that there may be a different number of rules 602, including very large numbers of rules 602.

As depicted, rule 602a includes type of session field 604 that shows "mobile unlock" as the type of session for which secure resume is permitted, resume method field 606 that shows "unlock hotkey+power button" as the input (secure unlock input or unlock pattern) that is to be used to securely unlock a mobile device, and actions field 608 that shows "minimize all running applications and display home screen" as the actions to be performed to provide a secure unlock of the mobile device. Note that, in this example, the secure resume is a secure unlocking of the mobile device (i.e., the secure resume of the mobile device session). According to rule 602a, if an "unlock hotkey+power button" input is detected on a mobile device on which secure resume policy 600 is applied, then rule 602a applies and the indicated actions (i.e., minimize all running applications on the mobile device and display home screen on the mobile device) are performed to provide a secure unlock of the mobile device. A secure unlock of the mobile device is provided because minimizing all running applications and/or displaying a home screen presents a user interface on the unlocked mobile device without display of data.

Similarly, rule 602b includes type of session field 604 that shows "PC unlock" as the type of session for which secure resume is permitted, resume method field 606 that shows "shift key+enter" as the input (secure unlock input or unlock pattern) that is to be used to securely unlock a PC, and actions field 608 that shows "minimize all running applications and display home screen" as the actions to be performed to provide a secure unlock of the PC. Similar to the mobile unlock example above, in this example, the secure resume is a secure unlocking of the PC (i.e., the secure resume of the PC session). According to rule 602b, if a "shift key+enter" input, for example, using a keypad or keyboard, is detected on a PC on which secure resume policy 600 is applied, then rule 602b applies and the indicated actions (i.e., minimize all running applications on the PC and display a home screen on the PC) are performed to provide a secure unlock of the PC. A secure unlock of the PC is provided because minimizing all running applications and displaying a home screen presents a user interface on the unlocked PC without display of data.

Rule 602c includes type of session field 604 that shows "remote desktop" as the type of session for which secure resume is permitted, resume method field 606 that shows "secure resume flag set in remote desktop session launch command" as an indication of how to launch a secure resume of a remote desktop session, and actions field 608 that shows "minimize all running applications and display desktop window" as the actions to be performed to provide a secure resume of the requested remote desktop session. Accordingly, if a command to launch a remote desktop session includes a secure resume flag, then rule 602c applies and the indicated actions (i.e., minimize all running applications associated with the resumed remote desktop session and display a desktop window) are performed to provide a secure resume of the launched remote desktop session. For example, in the case where the Citrix Independent Computing Architecture (ICA) protocol is used to pass data between remote desktop servers and remote desktop clients, the secure resume flag may be included (i.e., set) in an ICA file sent or otherwise provided to initiate a launch of the remote desktop session. Performing the actions indicated in rule 602c prevents the resumed remote desktop session content from being visible when the remote desktop session is launched.

Rule 602d includes type of session field 604 that shows "remote application" as the type of session for which secure resume is permitted, resume method field 606 that shows "secure resume flag set in remote application session launch command" as an indication of how to launch a secure resume of a remote application session, and actions field 608 that shows "kill the existing running remote application and relaunch the remote application" as the actions to be performed to provide a secure resume of the requested remote application session. Accordingly, if command to launch a remote application session includes a secure resume flag, then rule 602d applies and the indicated actions (i.e., kill the existing running remote application and relaunch the remote application) are performed to provide a secure resume of the launched remote application session. In the case where the Citrix ICA protocol is used to pass data between remote application servers and remote application clients, the secure resume flag may be included (i.e., set) in an ICA file sent or otherwise provided to initiate a launch of the remote application session. Performing the actions indicated in rule 602d prevents the resumed remote application session content from being visible when the remote application session is launched.

Rule 602e includes type of session field 604 that shows "SaaS application" as the type of session for which secure resume is permitted, resume method field 606 that shows "secure resume flag set in application session launch command" as an indication of how to launch a secure resume of a SaaS application session, and actions field 608 that shows "start application with the initial page by reloading initial URL" as the actions to be performed to provide a secure resume the requested SaaS application session. Accordingly, if a command to launch a SaaS application session includes a secure resume flag, then rule 602e applies and the indicated actions (i.e., start the SaaS application by the initial page by reloading the SaaS application's URL) are performed to provide a secure resume of the launched SaaS application session. Performing the actions indicated in rule 602e prevents the resumed SaaS application session content from being visible when the SaaS application session is launched.

Figure 7:
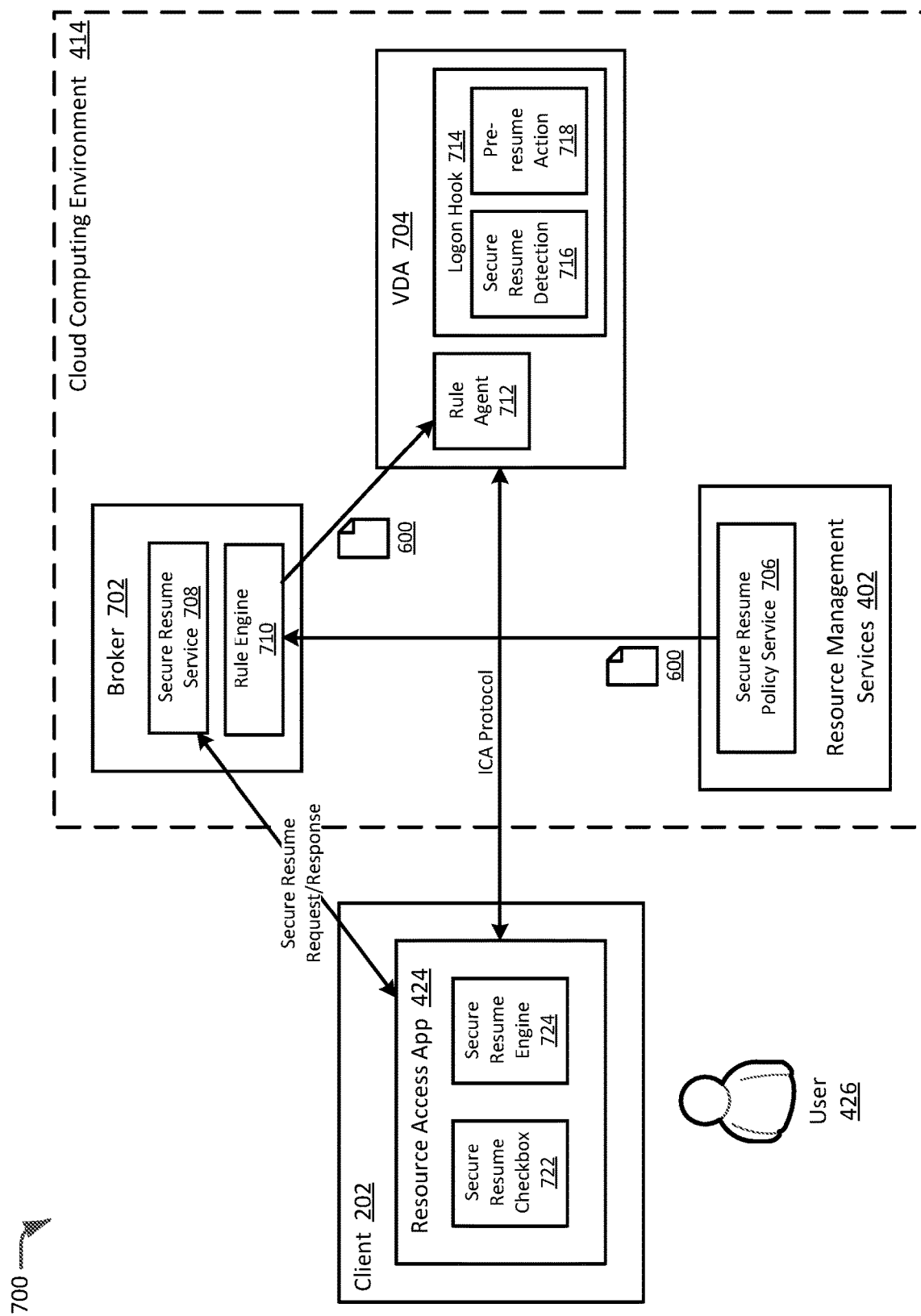
FIG. 7 is a block diagram of an example network environment in which secure resume of disconnected sessions may be implemented, in accordance with an embodiment of the present disclosure.

FIG. 7 is a block diagram of an example network environment 700 in which secure resume of disconnected sessions may be implemented, in accordance with an embodiment of the present disclosure. In FIG. 7, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As can be seen, network environment 700 includes client 202, resource management services 402, a broker 702, and a virtual delivery agent (VDA) 704. In the example shown, resource management services 402, broker 702, and VDA 704 may be located within cloud computing environment 414, and client 202 may be communicably coupled to cloud computing environment 414, including the various components of cloud computing environment 414, via one or more networks (not shown), such as, for example, network 104 described above in the context of FIG. 1. While only one client 202 and one corresponding VDA 704 are shown in FIG. 7, the structures and techniques sought to be protected herein can be applied to any number of clients and VDAs, including any numbers of other types of delivery and connection agents.

In brief, network environment 700 may provide services for one or more organizations, with the organizations having one or more users associated with it. For example, in some embodiments, a user of the organization (e.g., user 426) may utilize resource access application 424 running on a client device (e.g., client 202) to connect to and establish sessions with the user's resources, including network resources and applications (e.g., SaaS and web applications), files, and virtual desktops (e.g., Citrix Virtual Apps and Desktops™), disconnect sessions, and reconnect and securely resume the disconnected sessions. To facilitate secure resume of one or more sessions, the organization may provision a secure resume policy, such as secure resume policy 600.

In more detail, resource management services 402 includes a secure resume policy service 706. Secure resume policy service 706 may send or otherwise provide to broker 702 the secure resume policy 600. As described previously, secure resume policy 600 may include one or more rules (e.g., rules 602) to govern the secure resume of disconnected sessions to resources provided by resource management services 402. Via secure resume policy service 706, an organization can define secure resume policy 600 related to the resources provided by the organization, and the secure resume of sessions to these resources. As described previously, the rules contained in secure resume policy 600 can determine the types of sessions for which secure resume is permitted, the manner in which to launch a secure resume of these sessions, and the action or actions that will be performed in order to provide secure resume of the launched sessions. As one example, an organization may define a rule that permits secure resume of remote desktop sessions by sending or otherwise providing a command to launch a remote desktop session that includes (or sets) a flag. In the defined rule, the organization may specify that all running applications associated with the resumed remote desktop session will be minimized in order to provide a secure resume of the launched remote desktop session. As another example, an organization may define a rule that permits secure resume of SaaS application sessions by sending or otherwise providing a command to launch a SaaS application session that includes (or sets) a flag. In the defined rule, the organization may specify that the SaaS application's initial URL will be reloaded to provide a secure resume of the launched SaaS application session. As another example, an organization may define a rule that permits secure unlock of mobile devices by inputting a specific unlock command (e.g., unlock hotkey+power button). In the defined rule, the organization may specify that all running applications on the mobile device will be minimized and/or a default desktop window will be displayed on the mobile device in order to provide a secure unlock of the mobile device. As yet another example, an organization may define a rule that specifies that the audio function of the mobile device is to be muted.

Broker 702 may be a connection broker that manages the connections to the resources, such as applications, SaaS applications, desktops, web sites, databases, and other types of network or connection-based resources, provided by resource management services 402. To this end, broker 702 may function as the "middle" component between the provided resources and the clients (e.g., resource access application 424), and may keep track of which users are logged on, which resources individual users or groups of users are allowed to access, which physical or virtual machines are hosting (delivering) which resources, and which agents on the machines are providing (hosting) which sessions to which users, for instance. Broker 702 may be responsible for aggregating, managing, and monitoring agent instances on the machines that are hosting the resources. For example, broker 702 may negotiate session launch requests from a client via resource management services 402 for one or more provided resources. Once the machines hosting the requested resources are established, broker 702 may maintain information (e.g., an IP address and port of the machines hosting the requested resources, preferred transport protocol (e.g., TCP or UDP), zone (location), fully qualified application path, and executable module name) necessary for establishing the sessions between the clients and the machines hosting the requested resources.

As can be seen in FIG. 7, broker 702 includes a secure resume service 708 and a rule engine 710. Secure resume service 708 may process the secure resume requests from the clients, such as resource access application 424. For example, in an implementation, in response to receipt of a secure resume request (i.e., a request for a secure resume of a disconnected session) from a client, secure resume service 708 can check secure resume policy 600 to determine whether there is a matching rule that permits a secure resume of the requested session. If a determination is made that a matching rule exists in secure resume policy 600, secure resume service 708 can generate a command in accordance with the resume method specified in the rule for use by the client to launch a secure resume of the session with an appropriate agent. For example, suppose that the secure resume request is to securely resume a SaaS application session, and that the matching rule is rule 602e. In this example case, secure resume service 708 can generate a SaaS application session launch command that includes a secure resume flag for use by the client to launch a secure resume of the requested SaaS application session. Secure resume service 708 can then send or otherwise provide to the client the generated command. Otherwise, if a determination is made that a matching rule does not exist in secure resume policy 600, secure resume service 708 can generate and provide to the client a launch command (e.g., a SaaS application session launch command that does not include a secure resume flag) for use by the client to launch a normal resume of the session with an appropriate agent.

Rule engine 710 is configured to propagate the rules (e.g., rules 602) to the machines (physical and virtual machines) hosting the resources provided by resource management services 402. As described previously, secure resume policy service 706 may send or otherwise provide to broker 702 secure resume policy 600 that includes rules 602. Upon receipt of secure resume policy 600, rule engine 710 can propagate secure resume policy 600 to the individual machines that are hosting the resources. For example, rule engine 710 may communicate with a corresponding agent on the individual machines hosting the resources to deliver secure resume policy 600.

Still referring to FIG. 7, VDA 704 may be installed on and execute on the individual machines that are hosting the resources. In embodiments, VDA 704 serves as an agent that allows the machine and the resources hosted by the machines to be made available to users. VDA 704 enables users to connect to the resources being hosted on the machine. To this end, VDA 704 is configured to establish and manage the sessions between the clients and the machines hosting the requested resources. VDA 704 may communicate session information to broker 702. VDA 704 may also verify that a valid license is available for the user or session. VDA 704 may also apply rules, such as, for example, the rules in secure resume policy 600, that are configured for the session.

As can be seen in FIG. 7, VDA 704 includes a rule agent 712 and a logon hook 714. Rule agent 712 is configured to receive the rules (e.g., rules 602) that are to be applied to the sessions being hosted on VDA 704. For example, rule agent 712 may communicate with rule engine 710 of broker 702a to receive secure resume policy 600, including rules 602, propagated by rule engine 710.

Logon hook 714 operates to apply the rules (e.g., rules 602) in secure resume policy 600 to session launch commands received by VDA 704 to determine whether a session launch command is a command for a secure resume of the session (i.e., a command to launch a secure resume of the session). Upon a determination that a session launch command is a command for a secure resume of the session, logon hook 714 identifies the action or actions based on the applicable rule 602 and initiates or otherwise triggers performance of the identified actions to cause a secure resume of the launched session. As noted previously, a secure resume of a disconnected session may be established by preventing session content from being visible when the session is being launched, and the actions defined in the rules control the display of session content. As such, the actions need to be performed during the launch process and before the launch process completes. To this end, in some embodiments, logon hook 714 is programmed or otherwise configured to (e.g., includes modules that are configured to) execute during a login process associated with the launching of the session. For example, in an implementation, logon hook 714 may hook into the login process and execute at the start of the login process prior to the conventional login processing. Hooking into the login process in this manner allows the initiated actions to control the display of session content on a computing device to complete prior to the completion of the conventional login processing.

As can be seen in FIG. 7, in some embodiments, logon hook 714 includes a secure resume detection 716 and a pre-resume action 718. Secure resume detection 716 is configured to determine whether a session launch command received by VDA 704 is a command to launch a secure resume of the session. For example, secure resume detection 716 can check the rules in secure resume policy 600 for a rule having a resume method that matches the session launch command. If such a rule is found in secure resume policy 600, secure resume detection 716 may send or otherwise provide an indication to pre-resume action 718 informing that the received session launch command is a command to launch a secure resume of the session. Secure resume detection 716 may also provide to the pre-resume action 718 an indication of the applied rule (i.e., the rule in secure resume policy 600 that matches the received session launch command). Pre-resume action 718 is configured to initiate performance of the action or actions specified in the applied rule. In an example implementation, pre-resume action 718 may utilize application programming interfaces provided by an underlying operating system to send a command or commands to the underlying operating system to perform the action or actions specified in the applied rule. For example, in the case of WINDOWS® operating systems, pre-resume action 718 may use the SendMessage function (e.g., SendMessage (hwnd, WM_COMMAND, (WPARAM)MIN_ALL, 0)) to send a command to the underlying WINDOWS® operating system to perform an action.

As described above, user 426 may utilize resource access application 424 running on client 202 to connect to and establish a session with a network resource, disconnect the session, and reconnect and securely resume the disconnected session at a later time. To enable user 426 to request a secure resume of a disconnected session, resource access application 424 may include a secure resume checkbox 722 and a secure resume engine 724. Checkbox 722 may be a control, such as a check box, provided on a UI or window of resource access application 424 which can be selected (clicked) to enable the secure resume feature provided by resource management services 402. For example, user 426 can click or otherwise select checkbox 722 to enable or disable the secure resume feature. When the secure resume feature is enabled, resource access application 424 processes requests to reconnect disconnected sessions as requests to reconnect and securely resume the disconnected sessions.

Secure resume engine 724 is configured to process requests to reconnect disconnected session input via resource access application 424 based on the status of checkbox 722. For example, in response to user 426 input to reconnect a disconnected session, secure resume engine 724 can check the status of checkbox 722 to determine whether the secure resume feature is enabled. In response to a determination that the secure resume feature is enabled, secure resume engine 724 can send to broker 702 a secure resume request for the disconnected session. Otherwise, if the secure resume feature is not enabled, secure resume engine 724 can send to broker 702 a normal resume request for the disconnected session. In any case, in response to the request sent to broker 702, secure resume engine 724 can receive a response that includes a session launch command for use by secure resume engine 724 to reconnect and resume the disconnected session. For example, in response to sending a secure resume request for a disconnected session, secure resume engine 724 may receive from broker 702 a response that includes a session launch command that can be used to launch a secure resume of the disconnected session. Note however that, in some cases, secure resume engine 724 may receive from broker 702 a response that includes a session launch command that can be used to launch a normal resume of the disconnected session (e.g., in cases where broker 702 determines that secure resume policy 600 does not permit a secure resume of the disconnected session). In this case, in an implementation, secure resume engine 724 can cause resource access application 424 to provide a notification (e.g., display an error message) informing user 426 that a secure resume is not permitted for the disconnected session. Conversely, in response to sending a secure resume request for a disconnected session, secure resume engine 724 may receive from broker 702 a response that includes a session launch command that can be used to launch a normal resume of the disconnected session.

Figure 8:
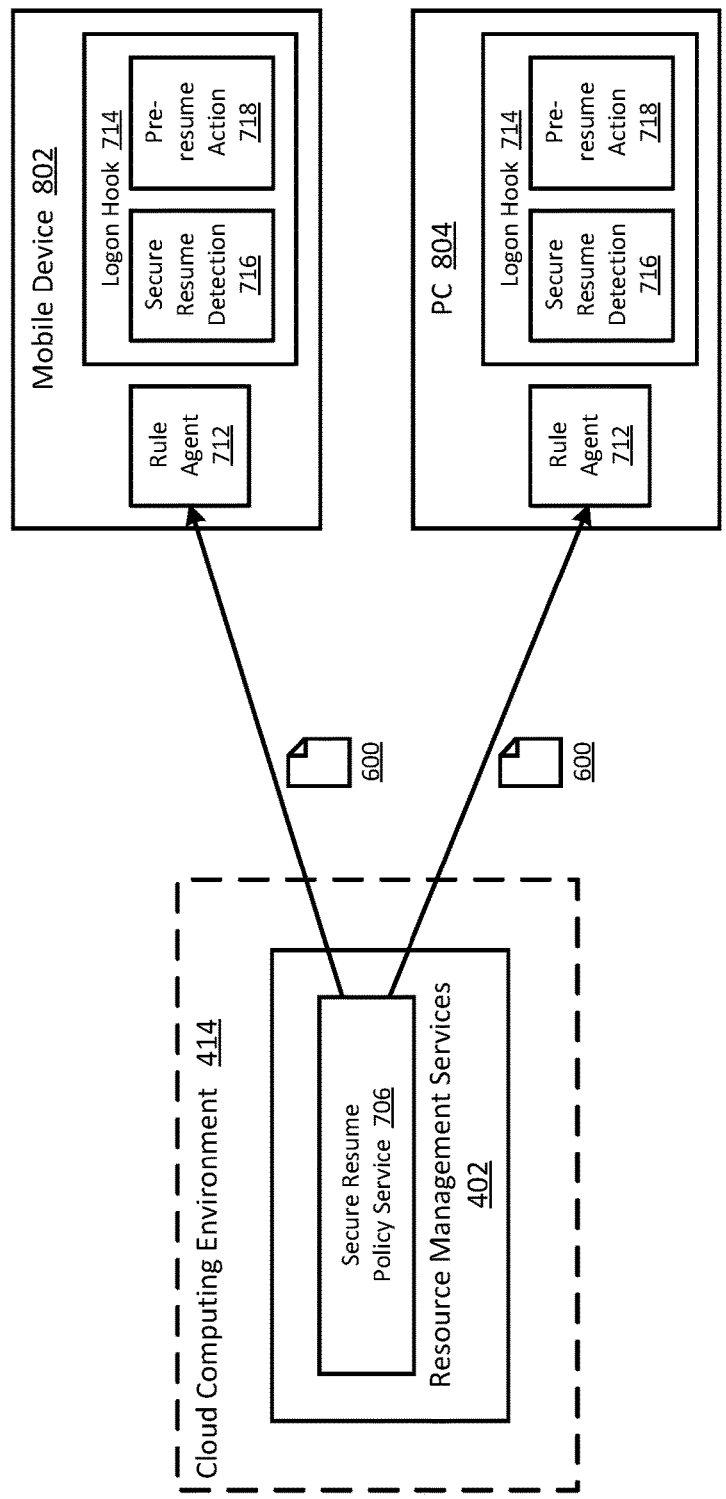
FIG. 8 is a block diagram of an example network environment in which secure unlock of computing devices may be implemented, in accordance with an embodiment of the present disclosure.

Turning to FIG. 8, in which like elements of FIG. 7 are shown using like reference designators, illustrated is a block diagram of an example network environment 800 in which secure unlock of computing devices may be implemented, in accordance with an embodiment of the present disclosure. As can be seen, network environment 800 includes resources management services 402. A mobile device 802, and a PC 804. In the example shown, resource management services 402 may be located within cloud computing environment 414, and may be communicably coupled to mobile device 802 and PC 804 via one or more networks (not shown), such as, for example, network 104 described above in the context of FIG. 1. While only mobile device 802 and one PC 804 are shown in FIG. 8, the structures and techniques sought to be protected herein can be applied to any number of mobile devices and PCs, including any numbers of other types of computing device.

Network environment 800 may provide the secure resume feature to allow users to securely unlock computing devices for one or more organizations. For example, an organization may utilize a management service (e.g., a MMS system) to enable its users to access the organization's resources provided by resource management services 402 and/or personal resources from their computing devices, such as, for example, mobile device 802 and PC 804. The users may access the resources provided by resource management services 402 using computing devices (e.g., mobile device 802 and PC 804) that are purchased by the users or using computing devices (e.g., mobile device 802 and PC 804) that are provided by the organization to the users. In any case, the organization may use the management service to implement a device management policy to manage these computing devices. Computing devices that are managed through the application of device management policies may be referred to as enrolled devices. The organization may also choose to implement a secure resume policy (e.g., secure resume policy 600) to provide a secure resume feature to allow for the secure unlocking of the managed computing devices.

For instance, in the example shown in FIG. 8, mobile device 802 and PC 804 may be enrolled devices that are managed using the management service. In order to implement secure resume policy 600, resource management services 402 can obtain the identity of mobile device 802 and PC 804 from the management service. Once the identities of mobile device 802 and PC 804 are obtained, secure resume policy service 706 may provide to mobile device 802 and PC 804 secure resume policy 600 to govern the secure unlocking of mobile device 802 and PC 804.

Still referring to FIG. 8, mobile device 802 and PC 804 each include rule agent 712 and logon hook 714, which further includes secure resume detection 716 and pre-resume action 718. Rule agent 712 is configured to receive the rules (e.g., rules 602) that are to govern the secure unlocking of the computing device (e.g., mobile device 802 and PC 804). For example, rule agent 712 may communicate with secure resume policy service 706 of resource management services 402 to receive secure resume policy 600.

Logon hook 714 on the computing device (e.g., mobile device 802 and PC 804) operates to apply the rules (e.g., rules 602) in secure resume policy 600 to determine whether an input to unlock the computing device is an input to securely unlock the computing device. Upon a determination that an input to unlock the computing device is an input to securely unlock the computing device, logon hook 714 identifies the action or actions based on the applicable rule 602 and initiates performance of the identified actions to cause a secure unlocking of the computing device. As noted previously, a secure unlocking of a computing device may be established by preventing data from being visible when the computing device is unlocked, and the actions defined in the rules control the display of data. As such, the actions need to be performed during the computing device unlock process and before the unlock process completes. To this end, in some embodiments, logon hook 714 is programmed or otherwise configured to (e.g., includes modules that are configured to) execute during an unlock process of the computing device. For example, in an implementation, logon hook 714 may hook into the unlock process and execute at the start of the unlock process prior to the conventional unlock processing. Hooking into the unlock process in this manner allows the initiated actions to control the display of data on a computing device to complete prior to the completion of the conventional unlock processing. In some implementations, logon hook 714 may hook into a login process and execute at the start of the login process prior to the conventional login processing. In this manner, the actions are performed such that data is prevented from being displayed in a user interface first rendered subsequent to the unlocking of the computing device.

As can be seen in FIG. 8, in some embodiments, logon hook 714 includes secure resume detection 716 and pre-resume action 718. Secure resume detection 716 is configured to determine whether an input to unlock a computing device is an input to securely unlock the computing device. For example, secure resume detection 716 can check the rules in secure resume policy 600 for a rule having a resume method that matches the received input to unlock the computing device. If such a rule is found in secure resume policy 600, secure resume detection 716 may send or otherwise provide an indication to pre-resume action 718 informing that the received input to unlock the computing device is an input to securely unlock the computing device. Secure resume detection 716 may also provide to pre-resume action 718 an indication of the applied rule (i.e., the rule in secure resume policy 600 that matches the received input to unlock the computing device). Pre-resume action 718 is configured to initiate performance of the action or actions specified in the applied rule.

Figure 9:
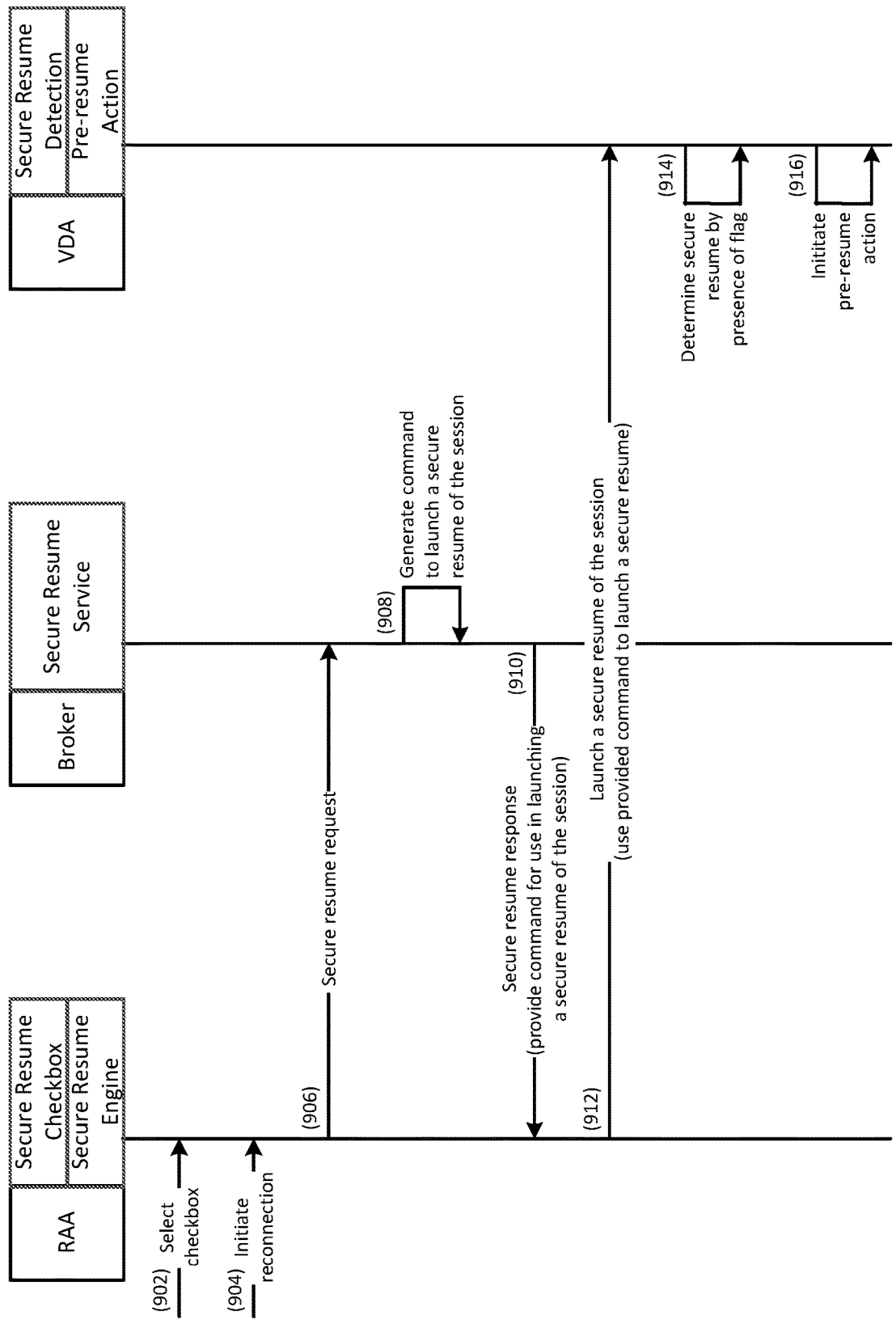
FIG. 9 is a diagram showing an example flow of interactions between various components to securely resume a session, in accordance with an embodiment of the present disclosure.

FIG. 9 is a diagram showing an example flow of interactions between various components to securely resume a session, in accordance with an embodiment of the present disclosure. For example, referring to both FIG. 7 and FIG. 9, user 426 may use an instance of resource access application 424 running on client 202 to access resources provided by resource management services 402. In this example, user 426 may have previously established and disconnected a virtual desktop session with resource management services 402 and may now want to securely resume the disconnected virtual desktop session. To do so, user 426 can select (902) checkbox 722 provided by resource access application 424 to enable the secure resume feature provided by resource management services 402. User 426 can then provide an input (904) to resource access application 424 to request a reconnect of the disconnected virtual desktop session. In response, secure resume engine 724 of resource access application 424 can determine, based on checkbox 722, that the received request is a request to reconnect and securely resume the disconnected virtual desktop session. Based on this determination, secure resume engine 724 can send (906) to broker 702 a request to securely resume the disconnected virtual desktop session.

Upon receipt of the request to securely resume the disconnected virtual desktop session, secure resume service 708 of broker 702 can determine from secure resume policy 600 that rule 602c permits secure resume of virtual desktop sessions. Based on this determination, secure resume service 708 can generate (908) a virtual desktop session launch command in accordance with the resume method specified in rule 602c for use by secure resume engine 724 to launch a secure resume of the disconnected virtual desktop session. For example, secure resume service 708 can generate a virtual desktop session launch command that includes a secure resume flag as specified by rule 602c. Secure resume service 708 can then send (910) to secure resume engine 724 a secure resume response (i.e., a response to the request to securely resume the disconnected virtual desktop session) that includes the generated virtual desktop session launch command that includes the secure resume flag.

Upon receipt of the secure resume response from secure resume service 708, secure resume engine 724 can use the included virtual desktop session launch command that includes the secure resume flag to launch (912) a secure resume of the disconnected virtual desktop session. For example, secure resume engine 724 can send to VDA 704 the virtual desktop session launch command to launch a secure resume of the disconnected virtual desktop session.

Upon receipt of the virtual desktop session launch command from secure resume engine 724, secure resume detection 716 of VDA 704 determines (914) from the presence of the secure resume flag that the virtual desktop session launch command is a command to launch a secure resume of the disconnected virtual desktop session. In other words, secure resume detection 716 determines that the virtual desktop session launch command that includes a secure resume flag matches the resume method specified in rule 602c included in secure resume policy 600. Based on this determination, pre-resume action 718 of VDA 704 initiates (916) performance of the actions specified in rule 602c. For example, in accordance with the actions specified in rule 602c, all running applications associated with the resumed virtual desktop session are minimized and a desktop window is displayed on client 202. Note that minimizing all running applications associated with the resumed virtual desktop session and/or displaying a desktop window prevents the resumed virtual desktop session content from being visible when the virtual desktop session is launched. In this manner, a secure resume of the virtual desktop session is provided.

Figure 10:
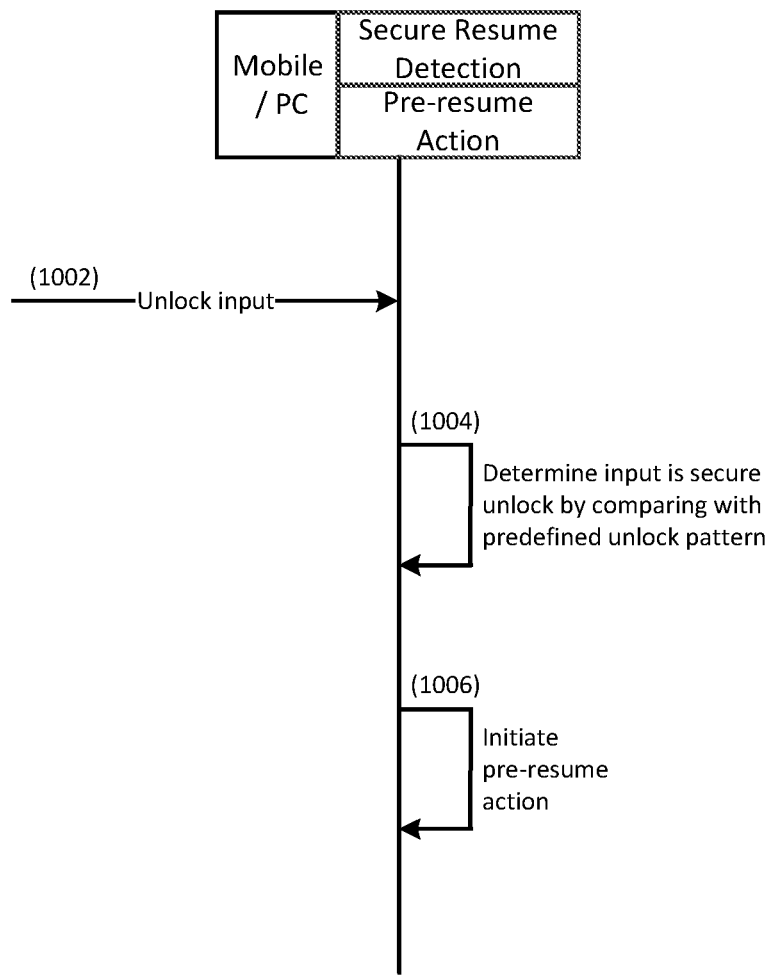
FIG. 10 is a diagram showing an example process to securely unlock a computing device, in accordance with an embodiment of the present disclosure.

FIG. 10 is a diagram showing an example process to securely unlock a computing device, in accordance with an embodiment of the present disclosure. For example, a user may be using a mobile device (e.g., mobile device 802) that is being managed by application of secure resume policy 600. In this example, the user may have locked the mobile device, for example, by pressing a button, such as a side button, on the mobile device. Subsequently, the user may provide (1002) an unlock input (e.g., depressing an unlock hotkey and power button) to securely unlock the locked mobile device. In response to the user's input on the mobile device, secure resume detection 716 on the mobile device determines (1004) that the unlock input is an input to securely unlock the mobile device. In other words, secure resume detection 716 determines that the input unlock hotkey and power button matches the resume method specified in rule 602a included in secure resume policy 600. Based on this determination, pre-resume action 718 on the mobile device initiates (1006) performance of the actions specified in rule 602a. For example, in accordance with the actions specified in rule 602a, all running applications on the mobile device are minimized and/or a home screen is displayed on the mobile device. Note that minimizing all running applications on the mobile device and displaying a home screen prevents data from being visible when the mobile device is unlocked. In this manner, a secure unlock of the mobile device is provided.

Figure 11:
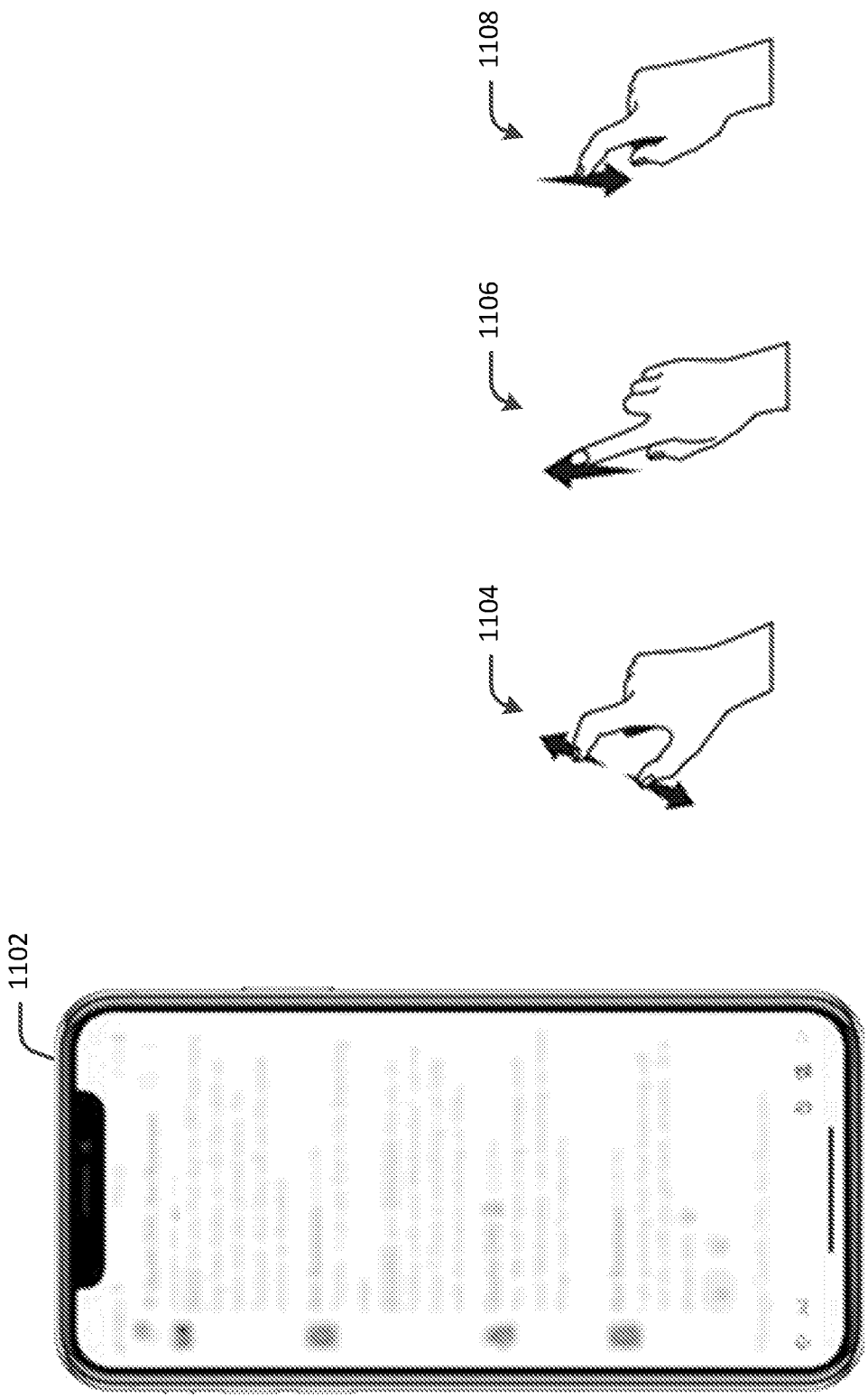
FIG. 11 shows a mobile device and example gestures to securely unlock the mobile device, in accordance with an embodiment of the present disclosure.

FIG. 11 shows a mobile device 1102 and example gestures 1104, 1106, 1108 to securely unlock mobile device 1102, in accordance with an embodiment of the present disclosure. Mobile device 1102 includes a touch-sensitive display (also known as a touch screen). The touch-sensitive display allows a user to interact with mobile device 1102 by detecting and responding to contact on the touch-sensitive display.

As shown in FIG. 11, when mobile device 1102 is unlocked in a normal manner (e.g., by pressing a pre-defined button or buttons or entering a code or password) and not securely unlocked using one of the resume methods specified in the rules in secure resume policy 600, mobile device 1102 displays content on the touch-sensitive display in a blurred or distorted form. A user may then provide a preconfigured gesture input, for example, using a finger or fingers, a stylus, or a digital pen, on the touch-sensitive display to securely unlock mobile device 1102. In embodiments, one or more rules 602 in secure resume policy 600 may specify the gesture inputs (i.e., the preconfigured gesture inputs) that can be input to securely unlock mobile device 1102.

For example, in response to detecting a pinch open gesture 1104 (e.g., detecting two fingers dragging in substantially opposite directions) on the touch-sensitive display, mobile device 1102 may securely unlock by disengaging the blurring or distortion of the displayed content, causing the displayed content to be visible on mobile device 1102. As another example, in response to detecting an upward swipe gesture 1106 (e.g., detecting a finger drag in a substantially upward direction) on the touch-sensitive display, mobile device 1102 may securely unlock by cleaning or removing the data from open applications and displaying a home screen on mobile device 1102. As another example, in response to detecting a downward swipe gesture 1108 (e.g., detecting a finger drag in a substantially downward direction) on the touch-sensitive display, mobile device 1102 may securely unlock by minimizing all running applications and displaying a home screen on mobile device 1102.

Further Example Embodiments

The following examples pertain to further embodiments, from which numerous permutations and configurations will be apparent.

Example 1 includes a method including: receiving, by a computing device, a request to resume a session, the session being hosted on a remote computer system and accessible by the computing device to enable display of content of the session via the computing device; initiating one or more actions on the remote computer system to prevent content of the session from being visible on the computing device in response to resumption of the session; and resuming the session on the remote computer system such that the content of the session is hidden from view within a display of the computing device as a result of the initiation of the one or more actions.

Example 2 includes the subject matter of Example 1, wherein the content of the session includes content being displayable by an application or a group of applications executable on the remote computer system.

Example 3 includes the subject matter of any of Examples 1 and 2, wherein initiating one or more actions on the remote computer system is based on a presence of a flag.

Example 4 includes the subject matter of any of Examples 1 through 3, further including receiving an approval for resumption of the session, the approval comprising a flag for use in determining the one or more actions.

Example 5 includes the subject matter of Example 4, wherein the approval for the resumption of the session is based on one or more rules.

Example 6 includes the subject matter of any of Examples 1 through 5, wherein the one or more actions is determined based on a rule.

Example 7 includes the subject matter of any of Examples 1 through 6, wherein the one or more actions includes minimizing at least one running application associated with the session.

Example 8 includes the subject matter of any of Examples 1 through 7, wherein the one or more actions includes displaying a desktop window of the session.

Example 9 includes the subject matter of Example 8, wherein the desktop window is maximized to fill the display of the computing device.

Example 10 includes the subject matter of any of Examples 1 through 9, wherein the one or more actions includes terminating execution of at least one running application associated with the session and launching execution of the terminated at least one application associated with the session.

Example 11 includes the subject matter of any of Examples 1 through 10, wherein the one or more actions includes starting at least one application associated with the session with its initial application page.

Example 12 includes a system including a memory and one or more processors in communication with the memory and configured to: receive a request to resume a session, the session being hosted on a remote computer system and accessible by a computing device to enable display of content of the session via the computing device; initiate one or more actions on the remote computer system to prevent content of the session from being visible on the computing device in response to resumption of the session; and resume the session on the remote computer system such that the content of the session is hidden from view within a display of the computing device as a result of the initiation of the one or more actions.

Example 13 includes the subject matter of Example 12, wherein the content of the session includes content being displayable by an application or a group of applications executable on the remote computer system.

Example 14 includes the subject matter of any of Examples 12 and 13, wherein to initiate one or more actions on the remote computer system is based on a presence of a flag.

Example 15 includes the subject matter of any of Examples 12 through 14, wherein the one or more processors are further configured to receive an approval for resumption of the session, the approval comprising a flag for use in determining the one or more actions.

Example 16 includes the subject matter of Example 15, wherein the approval for the resumption of the session is based on one or more rules.

Example 17 includes the subject matter of any of Examples 12 through 16, wherein the one or more actions is determined based on a rule.

Example 18 includes the subject matter of any of Examples 12 through 17, wherein the one or more actions includes minimizing at least one running application associated with the session.

Example 19 includes the subject matter of any of Examples 12 through 18, wherein the one or more actions includes displaying a desktop window of the session.

Example 20 includes the subject matter of Example 19, wherein the desktop window is maximized to fill the display of the computing device.

Example 21 includes the subject matter of any of Examples 12 through 20, wherein the one or more actions includes terminating execution of at least one running application associated with the session and launching execution of the terminated at least one application associated with the session.

Example 22 includes the subject matter of any of Examples 12 through 21, wherein the one or more actions includes starting at least one application associated with the session with its initial application page.

Example 23 includes a method including: detecting, by a computing device, an input to unlock the computing device; determining one or more actions to prevent a display of data on the computing device in response to the input to unlock of the computing device; initiating the one or more determined actions on the computing device to prevent display of the data on the computing device in response to unlock of the computing device; and presenting a user interface on a display of the computing device without display of the data within the display and in response to the initiation of the one or more determined actions.

Example 24 includes the subject matter of Example 23, wherein the detected input is one of an upward swipe motion, a downward swipe motion, a zoom in motion, depressing a control button on the computing device, or depressing a hotkey.

Example 25 includes the subject matter of any of Examples 23 and 24, wherein the one or more determined actions includes minimizing at least one application running on the computing device.

Example 26 includes the subject matter of any of Examples 23 through 25, wherein the one or more determined actions includes displaying a desktop window on the computing device.

Example 27 includes the subject matter of any of Examples 23 through 26, wherein to unlock the computing device comprises displaying a blurred desktop on the display of the computing device, and the one or more actions includes displaying the desktop to be visible on the display of the computing device.

Example 28 includes a computing device including a memory and one or more processors in communication with the memory and configured to: detect an input to unlock the computing device; determine one or more actions to prevent a display of data on the computing device in response to the input to unlock of the computing device; initiate the one or more determined actions on the computing device to prevent display of the data on the computing device in response to unlock of the computing device; and present a user interface on a display of the computing device without display of the data within the display and in response to the initiation of the one or more determined actions.

Example 29 includes the subject matter of Example 28, wherein the detected input is one of an upward swipe motion, a downward swipe motion, a zoom in motion, depressing a control button on the computing device, or depressing a hotkey.

Example 30 includes the subject matter of any of Examples 28 and 29, wherein the one or more actions includes minimizing at least one application running on the client device.

Example 31 includes the subject matter of any of Examples 28 through 30, wherein the one or more actions includes displaying a desktop window on the display of the client device Example 32 includes the subject matter of any of Examples 28 through 31, wherein to unlock the computing device comprises to display a blurred desktop on the display of the computing device, and the one or more actions includes displaying the desktop to be visible on the display of the computing device.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
  receiving, by a computing device, a request to resume a session, the session being hosted on a remote computer system and accessible by the computing device to enable display of content of the session via the computing device;

initiating one or more actions on the remote computer system to prevent content of the session from being visible on the computing device in response to resumption of the session, the one or more actions based on a rule, wherein the rule defines a type of session for which the rule applies and a resume method indicating a manner in which to launch a secure resume of the type of session; and resuming the session on the remote computer system such that the content of the session is hidden from view within a display of the computing device as a result of the initiation of the one or more actions.

2. The method of claim 1, wherein the content of the session includes content being displayable by an application or a group of applications executable on the remote computer system.

3. The method of claim 1, wherein initiating one or more actions on the remote computer system is based on a presence of a flag.

4. The method of claim 1, further comprising receiving an approval for resumption of the session, the approval comprising a flag for use in determining the one or more actions.

5. The method of claim 4, wherein the approval for the resumption of the session is based on one or more rules.

6. The method of claim 1, wherein the one or more actions includes minimizing at least one running application associated with the session.

7. The method of claim 1, wherein the one or more actions includes displaying a desktop window of the session.

8. The method of claim 7, wherein the desktop window is maximized to fill the display of the computing device.

9. The method of claim 1, wherein the one or more actions includes terminating execution of at least one running application associated with the session and launching execution of the terminated at least one application associated with the session.

10. The method of claim 1, wherein the one or more actions includes starting at least one application associated with the session with its initial application page.

11. A method comprising:

detecting, by a computing device, an input to unlock the computing device;

determining one or more actions to prevent a display of data on the computing device in response to the input to unlock of the computing device, the one or more actions based on a rule, wherein the rule defines a type of session for which the rule applies and a resume method indicating a manner in which to launch a secure resume of the type of session;

initiating the one or more determined actions on the computing device to prevent display of the data on the computing device in response to unlock of the computing device; and presenting a user interface on a display of the computing device without display of the data within the display and in response to the initiation of the one or more determined actions.

12. The method of claim 11, wherein the detected input is one of an upward swipe motion, a downward swipe motion, a zoom in motion, depressing a control button on the computing device, or depressing a hotkey.

13. The method of claim 11, wherein the one or more determined actions includes minimizing at least one application running on the computing device.

14. The method of claim 11, wherein the one or more determined actions includes displaying a desktop window on the computing device.

15. A computing device comprising:

a memory; and one or more processors in communication with the memory and configured to, detect an input to unlock the computing device;

determine one or more actions to prevent a display of data on the computing device in response to the input to unlock of the computing device, the one or more actions based on a rule, wherein the rule defines a type of session for which the rule applies and a resume method indicating a manner in which to launch a secure resume of the type of session;

initiate the one or more determined actions on the computing device to prevent display of the data on the computing device in response to unlock of the computing device; and present a user interface on a display of the computing device without display of the data within the display and in response to the initiation of the one or more determined actions.

16. The computing device of claim 15, wherein the detected input is one of an upward swipe motion, a downward swipe motion, a zoom in motion, depressing a control button on the computing device, or depressing a hotkey.

17. The computing device of claim 15, wherein the one or more actions includes minimizing at least one application running on the client device.

18. The computing device of claim 15, wherein the one or more actions includes displaying a desktop window on the display of the client device.

19. The computing device of claim 15, wherein to unlock the computing device comprises to display a blurred desktop on the display of the computing device, and the one or more actions includes displaying the desktop to be visible on the display of the computing device.

* * * * *